(12) United States Patent
Shapira et al.

(10) Patent No.: US 7,680,102 B2
(45) Date of Patent: Mar. 16, 2010

(54) METHOD AND SYSTEM FOR CONNECTING MANIPULATION EQUIPMENT BETWEEN OPERATOR'S PREMISES AND THE INTERNET

(75) Inventors: Yair Shapira, Haifa (IL); Chava Leviathan, Ra'anana (IL)

(73) Assignee: Flash Networks, Inc. (IL)

( * ) Notice: Subject to any disclaimer, the term of this patent is extended or adjusted under 35 U.S.C. 154(b) by 1497 days.

(21) Appl. No.: 10/517,351

(22) PCT Filed: Jun. 11, 2003

(86) PCT No.: PCT/IL03/00491

§ 371 (c)(1),
(2), (4) Date: Dec. 8, 2004

(87) PCT Pub. No.: WO03/107604

PCT Pub. Date: Dec. 24, 2003

(65) Prior Publication Data

US 2005/0237955 A1    Oct. 27, 2005

Related U.S. Application Data

(60) Provisional application No. 60/388,697, filed on Jun. 14, 2002.

(51) Int. Cl.
*H04L 12/56* (2006.01)
(52) U.S. Cl. ........................ 370/389; 370/392; 370/401; 709/236

(58) Field of Classification Search ............... 370/229, 370/230, 230.1, 231, 235, 389, 392, 400, 370/401; 709/231, 236
See application file for complete search history.

(56) References Cited

U.S. PATENT DOCUMENTS

| | | | |
|---|---|---|---|
| 6,173,399 B1 * | 1/2001 | Gilbrech | 713/153 |
| 6,226,748 B1 * | 5/2001 | Bots et al. | 726/15 |
| 6,496,867 B1 * | 12/2002 | Beser et al. | 709/245 |
| 7,095,716 B1 * | 8/2006 | Ke et al. | 370/230 |
| 7,376,125 B1 * | 5/2008 | Hussain et al. | 370/352 |
| 7,542,476 B2 * | 6/2009 | Almog et al. | 370/401 |

* cited by examiner

*Primary Examiner*—Pankaj Kumar
*Assistant Examiner*—Duc T Duong
(74) *Attorney, Agent, or Firm*—Smith Frohwein Tempel Breenlee Blaha, LLC; Gregory Scott Smith

(57) ABSTRACT

Traffic passing between remote terminals and corporate intranets through an access server provider network can encounter security and addressing problems. Intercepting and manipulating this traffic can overcome these, as well as other problems. For such traffic that is being transported over a plurality of Network Based Tunnels (NBT), this manipulation can be performed by manipulation equipment that may reside in the access server provider's network between an Access Gateway (AGW) and a Border Gateway (BGW). The manipulation equipment may manipulate received NBT packets by parsing the original packet that is encapsulated in the NBT packet, manipulating the original packet and reconstructing the NBT packet with the manipulated data of the original packet.

17 Claims, 9 Drawing Sheets

FIG. 6A

METHOD AND SYSTEM FOR CONNECTING MANIPULATION EQUIPMENT BETWEEN OPERATOR'S PREMISES AND THE INTERNET

RELATED APPLICATIONS

This patent application claims the benefit of the filing date of U.S. Provisional Application for Patent having Ser. No. 60/388,397 and having been filed on Jun. 14, 2002 and International Application Number PCT/IL03/00491 having an international filing date of Jun. 11, 2003, both of which are entitled METHOD AND SYSTEM FOR CONNECTING MANIPULATION EQUIPMENT BETWEEN OPERATOR'S PREMISES AND THE INTERNET.

FIELD OF THE INVENTION

The present invention relates to mobile data communication and, more particularly, to a system and method for connecting Manipulation Equipment (MEq) in a Wireless Operator's Premises that supports Enterprise Virtual Private Networks (VPN).

BACKGROUND

Conventionally, companies have networked geographically dispersed intra-corporation networks together through the use of private lines. This technique allowed for the formation of a network system that was isolated from external networks and thus, had some level of assurance that the network would be secure. However, when intra-corporation communication is conducted over the Internet, thereby taking advantage of the low cost associated with such connectivity, the enterprise communication is done through the use of a Virtual Private Network (VPN). The use of a VPN for such a solution results in virtually building private networks through the Internet by using the Internet Protocol (IP) facilities provided by IP networks and the facilities of lower layer protocols below the IP. This art enables building a safe network that is isolated from external networks and can provide quality assurance service of any level, even through the Internet.

Today, the workforce continues to migrate towards mobility and thus, the requirements for employees to have remote data access generates an increasing need for communication through Mobile VPNs (MVPN) that are spread over wire line networks and wireless data networks. A MVPN may use a combination of data packets, radio protocols on the mobile side (dynamic side) and tunneling protocols on the plane side (fix side, static side). A static tunnel between the wireless operator's premises and the intranet of a corporation, connecting through the Internet Service Provider (ISP), is called a Network Based Tunnel (NBT). An exemplary NBT may be a "Compulsory Tunnel" (CT). Throughout this description, the terms Network Based Tunnel and Compulsory Tunnel may be used interchangeably and/or have the same meaning. An exemplary protocol for packet communication over wireless data networks is the General Packet Radio Service (GPRS). Other wireless protocols may include, but are not limited to, HDR (High Data Rate), CDPD (Cellular Digital Packet Data), etc., as well as others not listed.

An NBT may be used by multiple peers of the same corporation and may be active even without any current transportation. The NBTs are based on protocols such as, but not limited to, the IPSec, LSP/IPSec, L2TP, GRE, IEEE 802.1Q (VLAN Tagging, or VLAN TAG, both terms are used interchangeably herein), IP over IP protocols, as well as other protocols not listed. The wireless operator has an Access Gateway (AGW), which converts NBT traffic coming through the Internet, or over a direct connection from the corporation's intranet, via a Border Gateway (BGW), into an appropriate wireless protocol and vice-versa. One example of an Access Gateway is the Gateway GPRS Support Node (GGSN). Another example of an Access Gateway is a Packet Data Serving Node (PDSN) such as those used in CDMA2000 Radio Access Network (RAN).

In intra-corporation networks, private IP addresses are often used. IP addresses are divided into public IP addresses and private IP addresses. Public IP addresses are globally defined unique addresses, whereas private IP addresses can be freely defined by a corporation. Thus, it is desirable for private IP addresses to be used when corporations use VPN service. If a plurality of VPNs are employed, and private IP addresses are used over the VPNs, it is possible that a private IP address used in one VPN is also used in another VPN during the same time over the wireless operator network.

To improve services, an operator may want to add Manipulation Equipment (MEq) that operates to interrupt the communication between a remote client and its final destination, and then perform some manipulation on the data. An exemplary MEq may be a personalization server that operates to add personal banners to the communication being directed towards the remote client. Another exemplary MEq may be a front-end content server such as the MS Exchange Server. Other MEq may operate to improve the speed of the communication and reduce the volume of data over the wireless lines. Generally, the MEq is located between the Access Gateway and the Border Gateway or Router. An MEq may manipulate the data in internal layers, such as: the Transport layer (TCP), in the application layer (HTTP, MAPI etc.) and in the content (html, gif etc.). Within the context of this description, the terms manipulation, optimization and acceleration may be used interchangeably and at times, may have the same meaning.

In the case of using a VPN, the communication between the Access Gateway and the Border Gateway is done through an NBT. Therefore there is a need to break the NBT at the input to the MEq and reconstruct (re-tunnel) the tunnel at the output of the MEq. Moreover, the tunnel between the operator's network and the corporation's intranet(s) may comprises a plurality of connections from a plurality of mobile peers, some of them may use the MEq and others may not. Furthermore, the communication from/to a client using the MEq may contain information that is not handled by the MEq. These are some of the difficulties that a system, which splits the NBT, needs to overcome in re re-constructing, or re-tunneling, the tunnel. In addition to these difficulties, the data that returns from the MEq may be different than the data that was sent to the MEq.

The transportation over the VPN may be protected by mechanisms such as Remote Authentication Dial In User Service (RADIUS) in the plane section. Another mechanism may be to encrypt the data flow. These methods operate to protect the confidentiality of the connection. The splitter system, which reads, processes and manipulates the transportation, needs to inter-operate with these methods.

Therefore there is a need for a system and a method for splitting a plurality of VPN tunnels, in between the Access Gateway in the operator's network and a plurality of corporate intranets over a data network (like the Internet or via private connection), decrypting the data, redirecting the data to a manipulation server, manipulating the data, receiving the manipulated data, encrypting the manipulated data and reconstructing the appropriate tunnels (re-tunneling) again.

SUMMARY OF THE INVENTION

The present invention provides a system and a method that enables manipulation of data in an Access Service Provider network. The manipulation is done while the data is transported over a plurality of Network Based Tunnels (NBT) between a remote client (for example a wireless client) and the intranet of the client's corporation. The system may reside in the Access Server Provider's network between the Access Gateway (AGW) and the Border Gateway (BGW). The present invention may manipulate transportation between a remote client and its corporate intranet by parsing the packet of the NBT, transferring the original packet, the packet that is encapsulated in the NBT packet, to the MEq, manipulating the original packet and reconstructing the NBT packet with the manipulated data. The present invention is operative in both directions.

Other features and advantages of the present invention will become apparent upon reading the following detailed description of the embodiments with the accompanying drawings and appended claims.

BRIEF DESCRIPTION OF THE DRAWINGS

FIG. 2 is a block diagram illustrating the employment of modification equipment within the network topology embodiment shown in FIG. 1a.

DETAILED DESCRIPTION OF THE INVENTION

Figure 1A:
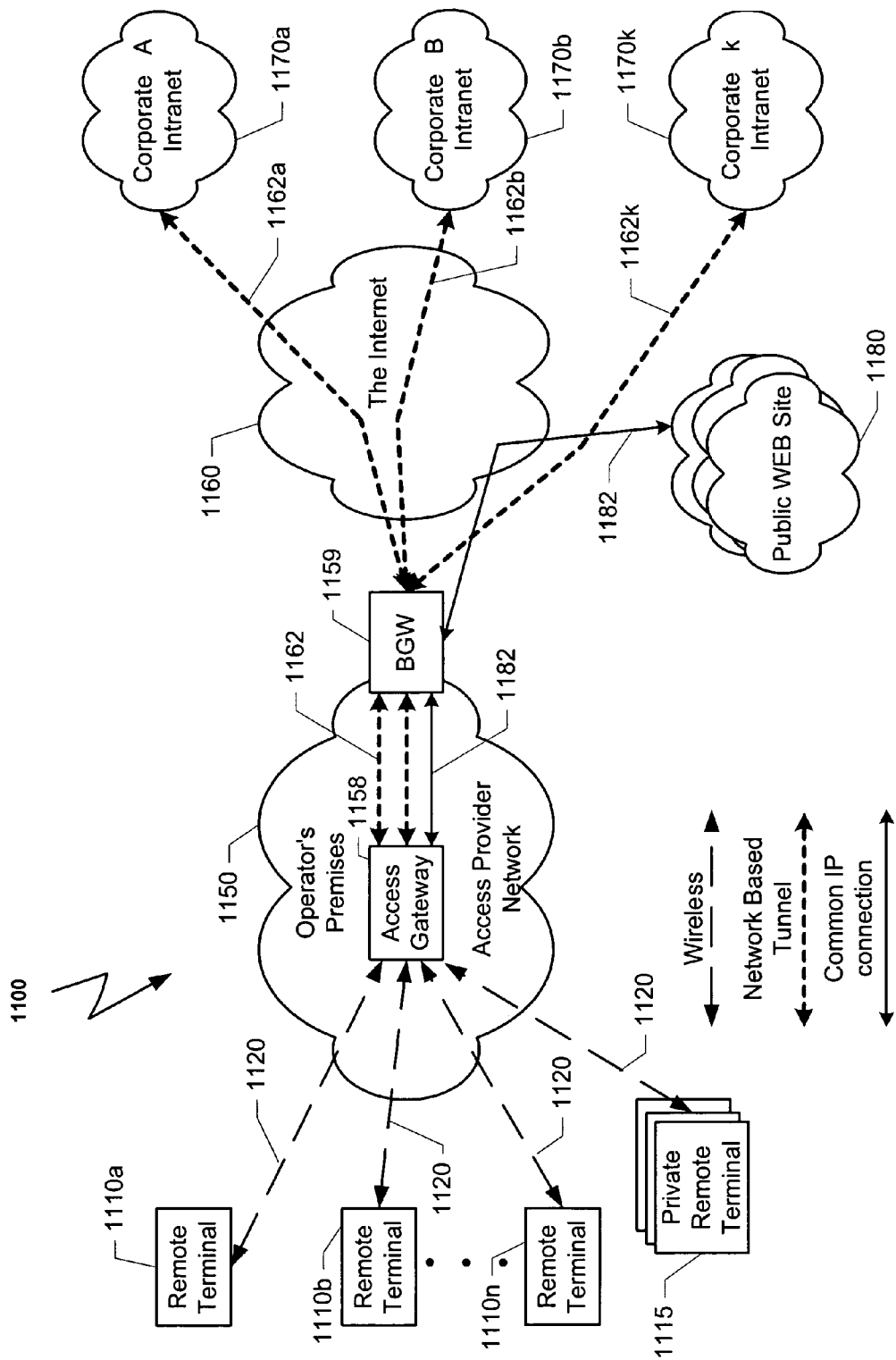
FIG. 1a is a block diagram of general intra-corporation communication between remote peers and their corporate intranet.

Referring now to the drawings, in which like numerals refer to like parts throughout the several views, exemplary embodiments of the present invention are described.

FIG. 1a is a block diagram of intra-corporation communication between mobile peers and their corporate intranet. A communication system 1100, which uses tunnels between the Access Provider Network (APN) 1150 and the corporate intranet, has been selected as an exemplary environment that is suitable for implementing the present invention. The communications system 1100 may be a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

A plurality of remote terminals, 1110a-1110n, are connected via data links 1120 to an Access Gateway (AGW) 1158 within the Access Provider Network 1150. The connection between the remote terminals 1110a-1110n and the APN 150 may be via intermediate nodes (such as a base station etc,) not shown in FIG. 1a. The remote terminals 1110a-1110n represent any devices that can communicate data over a data network using an Internet Protocol, including but not limited to: laptop computers, palm computers, cellular phones or the like. By way of example, FIG. 1a illustrates the use of three terminals; however, those skilled in the art will realize that any number of terminals could be used in this system.

The AGW 1158 acts as an access gateway. It provides foreign agent support and packet transport for virtual private networking. It also acts as an Authentication, Authorization, and Accounting (AAA) agent for the remote client. AGW 1158 may be a Remote Access Server (RAS), GGSN or PDSN or any other similar node. The AGW 1158 is the gateway between the network system of the wireless operator and the external data network, which may be the Internet 1160 and/or the corporate intranets 1170 that may be connected directly to the operator's premises 1162k or via the Internet 1160. The AGW 1158 performs the following operations in the uplink direction:

(a) the AGW 1158 terminates the connection from remote terminals 1110 and initiates the setup of an NBT 1162 to the appropriate corporate intranet 1170a-1170k through Border Gateway (BGW) 1159;

(b) the AGW 1158 routes the appropriate packets received from a remote client to the appropriate NBT 1162 of his/her corporation;

(c) the AGW 1158 may send via the same NBT 1162, packets of different users that belong to the same corporation.

The AGW 1158 performs the following operations in the downlink direction:

(a) the AGW 1158 terminates the NBT 1162 and forwards packets to the remote clients 1110a-1110n and 1115; and (b) the AGW 1158 receives through the same tunnel 1162 packets with destination addresses of different remote clients 1110 of the same corporation.

By way of example, three corporate intranets 1170a-1170k are illustrated, however, those skilled in the art will realize that any number of corporate intranets 1170 could be included.

From AGW 1158, the traffic through the NBT 1162 is transferred via a Border Gateway (BGW) 1159 that routes each NBT to the appropriate corporate intranet 1170. Within this description, the terms BGW and the Border Router may be used interchangeably.

Traffic from private remote user 1115 not belonging to any of the corporations or not intended for a corporate intranet, follows the path through the wireless connection 1120 to AGW 1158, BGW 1159, the Internet 1160 and finally to public web sites 1180 via common IP connections 1182 to its final destination and not via any of the NBT 1162. The IP connection 1182 may include, but is not limited to, TCP, UDP and others.

Figure 1B:
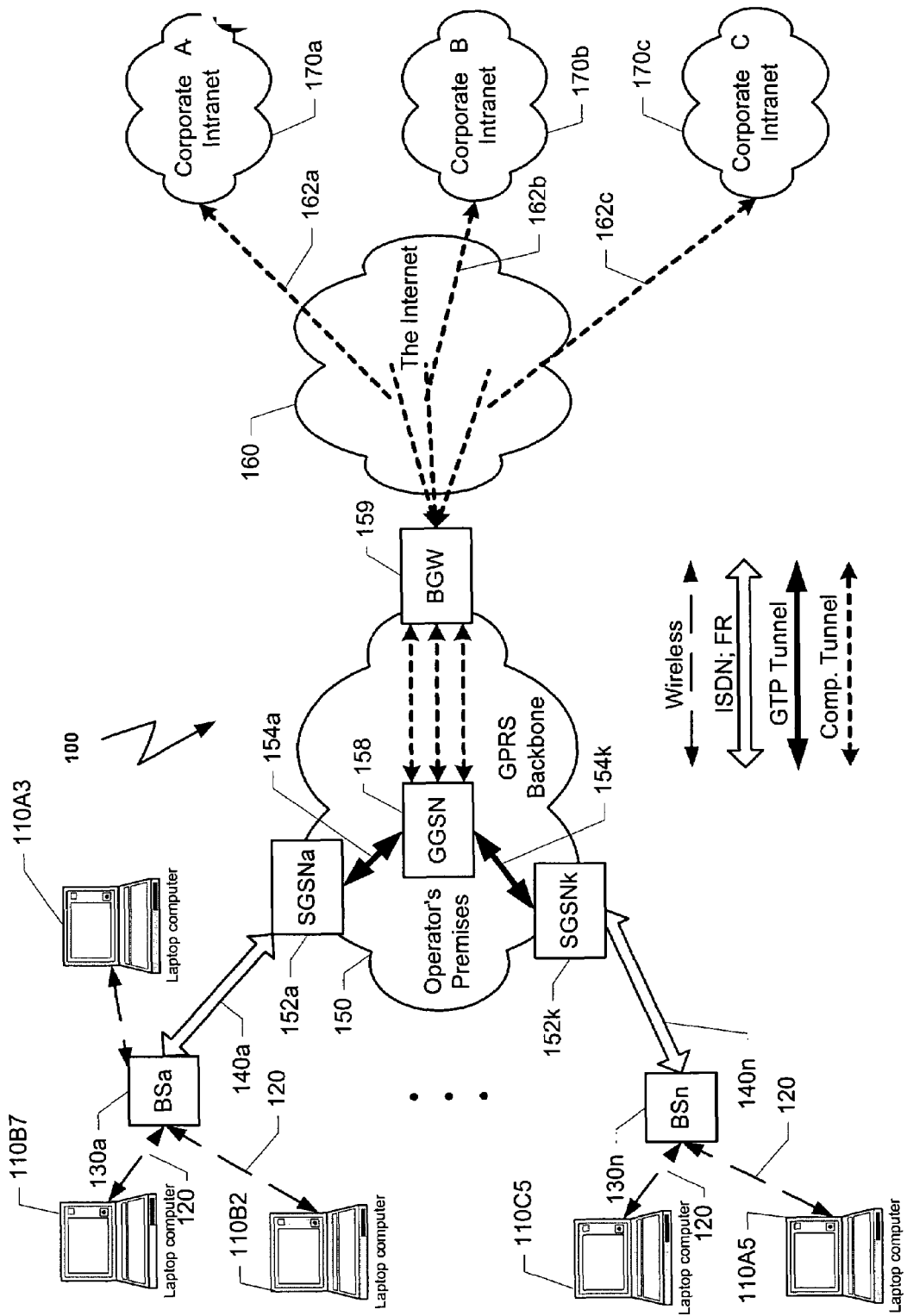
FIG. 1b is a block diagram of intra-corporation communication between remote peers and their corporate intranet, while the Access Provider is using GPRS network.

FIG. 1b is a block diagram of intra-corporation communication between mobile peers and their corporation while the Access Provider is using a GPRS network. A cellular system 100 based on the GPRS protocol has been selected as an exemplary environment that is suitable for implementing an embodiment of the present invention. However, the present invention is not limited to any particular cellular communication system, but rather, any other communications system using tunnels may be employed. Such other communication systems include, but are not limited to, communication over: satellites networks, PSTN (Public Switched Telephone Network), ISDN (Integrated Services Digital Network) lines or the like.

A plurality of laptop computers (110A5, 110C5, 110B2, 110B7 and 110A3) are connected via cellular connections 120 to a plurality of Base Stations (BS) 130a-130n. The laptop computers 110 represent any portable devices that can communicate data over a wireless network using an Internet Protocol, such as but not limited to, palm computers, cellular phones or the like. By way of example, three laptop computers 110 are shown as connected to each BS 130, however, those skilled in the art will realize that any number of laptop computers 110 can be connected. Also, by way of example, two BS 130 are connected to the operator's premises; however, those skilled in the art will realize than any number of BSs could be used. BS 130 may be connected via a VWB (Very Wide Bandwidth) connection 140 to the operator's premises 150. The VWB connection may be a Frame Relay, ISDN, ATM, Fiber optic connection or any other appropriate connection.

The connection of the BS 130 to the operator premises 150 is terminated at System GPRS Support Node (SGSN) 152a to 152k. The SGSN is responsible for the mobility management; session management; authentication procedures; and routing the packets downlink to the appropriate BS 130 and sending the packets uplink via GTP tunnels 154a and/or 154k to the appropriate Gateway GPRS Support Node (GGSN) 158. GPRS Tunneling Protocol (GTP) tunnels run over IP-based Networks, in the wireless operator's premises between the SGSN 152 and the GGSN 158. By way of example, two SGSNs 152 in the operator's premises are shown; however, those skilled in the art will realize that any number of SGSNs 152 can be utilized. Each SGSN 152 may be connected to more than one GGSN 158, which may be located in another operator's premises (not shown).

The GGSN 158 is the Access Gateway between the GPRS Network System of the wireless operator and the external data network, which may be the Internet 160 and/or the corporate intranets 170 that may be connected directly to the operator's premises 150 (not shown in the drawing) or via the Internet 160.

The GGSN 158 performs the following tasks in the uplink direction:

(a) the GGSN terminates the GTP tunnels from SGSN 152 and initiates CTs 162 to the appropriate corporate intranet via Border Gateway (BGW) 159;

(b) the GGSN routes the appropriate packets received from a mobile client to the appropriate CT of his/her corporation; and (c) the GGSN 158 may send, via the same CT 162, packets originating from users that belong to the same corporation that are received via the same BS 130 or a different BS.

The GGSN 158 performs the following tasks in the downlink direction:

(a) the GGSN 158 terminates the CT 162 and forwards the packets over the GTP tunnels to the appropriate SGSN 152;

(b) the GGSN 158 receives via the same tunnel 162, packets with destination addresses of clients, who are currently connected to different BSs 130; and (c) the GGSN 158 routes the packets via the appropriate GTP tunnels to the appropriate SGSN 152.

From GGSN 158, the CT 162 are transferred via the Border Gateway (BGW) 159 that routes each CT to the appropriate corporation. The terms BGW and the Border Router may be used interchangeably throughout this description.

As illustrated in FIG. 1b, two users (110B2 and 110B7) associated with Corporation B, 170b, and one user (110A3) associated with Corporation A 170a are connected via BSa 130a, VWB 140a and SGSNa 152a, to the operator's premises 150. Please note that the identification numbers for the users utilize a letter (i.e. 'A' & 'C') to indicate the corporation that they are associated with, and a digit (i.e., 1-7) to indicate the private IP address of the remote client. Two users having the same private IP address (No. 5, 110A5 and 110C5), are connected via BSn 130n, VWB 140n and SGSNk 152k to the operator's premises 150. However each of these two users is associated with a different corporation, Corporation A and Corporation C, respectively. Although in FIG. 1b, each SGSN 152 is connected to a single BS 130, each SGSN 152 may be connected to a plurality of BSs 130.

From SGSN 152 to GGSN 158 the data travels via GTP tunnel 154. Each such tunnel may carry data of different users and different BSs 130. The GGSN 158 terminates the GTP tunnels 154 and generates CTs 162. Thus, a CT is generated for each corporation (tunnels 162a, 162b and 162c connecting to corporation 170a, 170b and 170c, respectively). The transportation between user 110A3 and corporation 170a is done via: BS a 130a, VWB 140a, SGSNa 152a, GTP tunnel 154a, GGSN 158 and CT 162a via BGW 159. The transportation between user 110A5 and corporation 170a is done via: BSa 130n, VWB 140n, SGSNk 152k, GTP tunnel 154k, GGSN 158 and CT 162a, BGW 159. etc. This present configuration of transportation paths is a momentary situation and can change as the user moves from one cell to the other.

Traffic from a cellular user that is not associated with any of the corporations is transported via the BS 130, VWB 140, SGSN 152, GGSN 158 and BGW 159 to the Internet via a common IP connection, like but not limited to, TCP, UDP etc., to its final destination and not via a CT.

Figure 2:
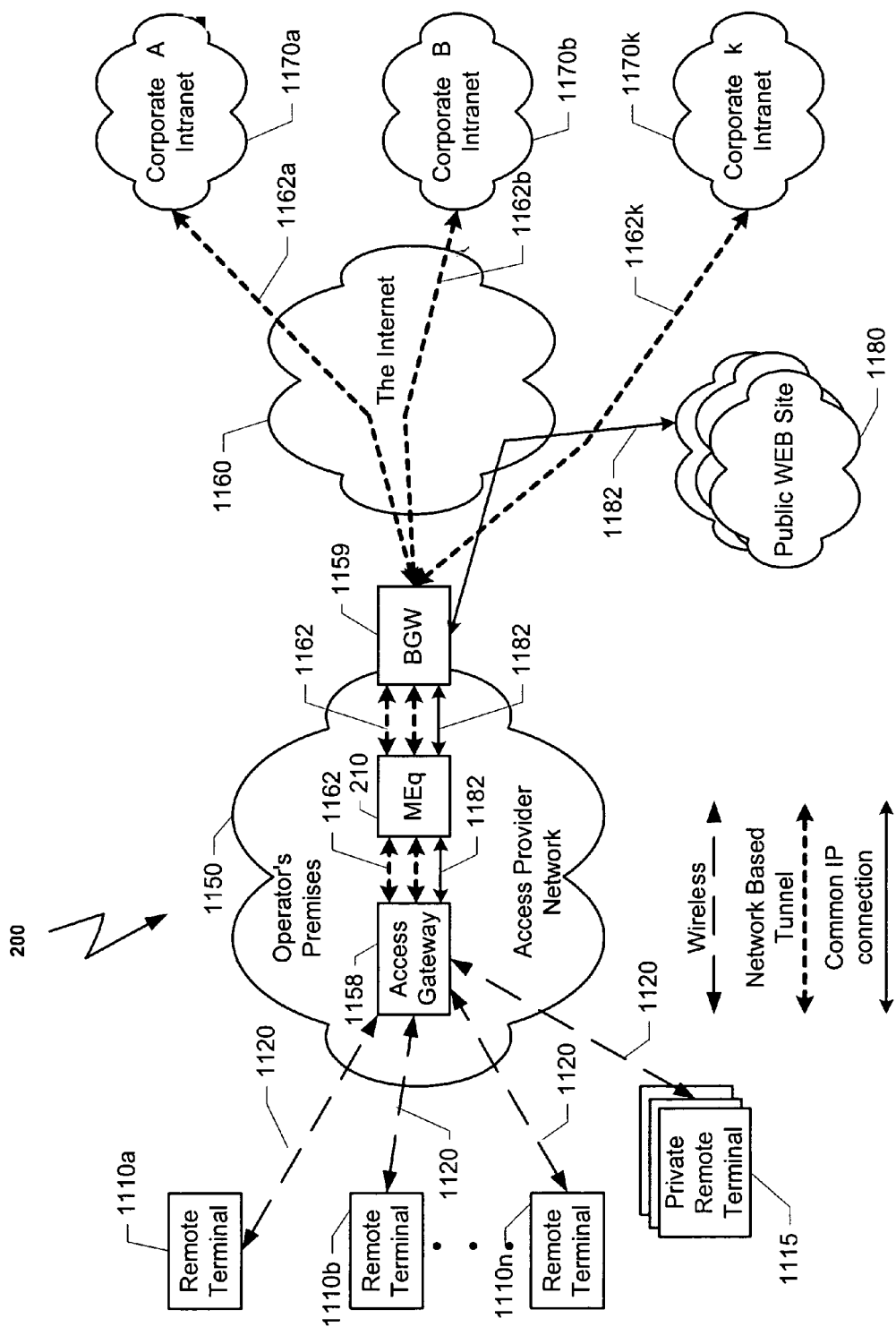

FIG. 2 is a block diagram illustrating the employment of modification equipment within the network topology embodiment provided in FIG. 1a. In general, FIG. 2 illustrates the communication between remote users with their plane destination. The remote terminals 1110a to 1110n may belong to mobile peers that communicate with their corporations (1170a to 1170k) via system 200 or private remote terminals 1115 that communicate with public web sites 1180. System 200 employs the use of a Manipulation Equipment Farm 210 (MEq) that is operating in accordance with an exemplary embodiment of the present invention.

An exemplary embodiment of the MEq 210 intercepts traffic being communicated between the operator premises 1150 and a corporation 1170. The MEq 210 receives all the packets that are flowing between the Access Provider Network 1150 via AGW 1158 and the BGW 1159 to the Internet 1160 and to corporate intranets 1170. In one exemplary embodiment, the MEq 210 may be configured as the default gateway for both sides of the Access Provider Network 1150, (i.e., for AGW 1158 and for the BGW 1159). In another exemplary embodiment, the MEq 210 may physically reside between the AGW 1158 and the BGW 1159. In both cases, the MEq 210 may be transparent to both sides of the NBT 1162 or to the IP connection 1182.

Other exemplary embodiments may use the IP address of the MEq 210 as the next hop address of the AGW 1158 (GRE Proxy). In such an embodiment, the MEq 210 terminates the NBT for both sides, for AGW 1158 and for the corporate intranet 1170. The destination address of the packets from AGW 1158 to the corporate intranet 1170 is the IP address of the MEq 210 and the source IP address of the packets from the MEq 210 to the corporation is the IP address of the MEq 210.

Figure 3:
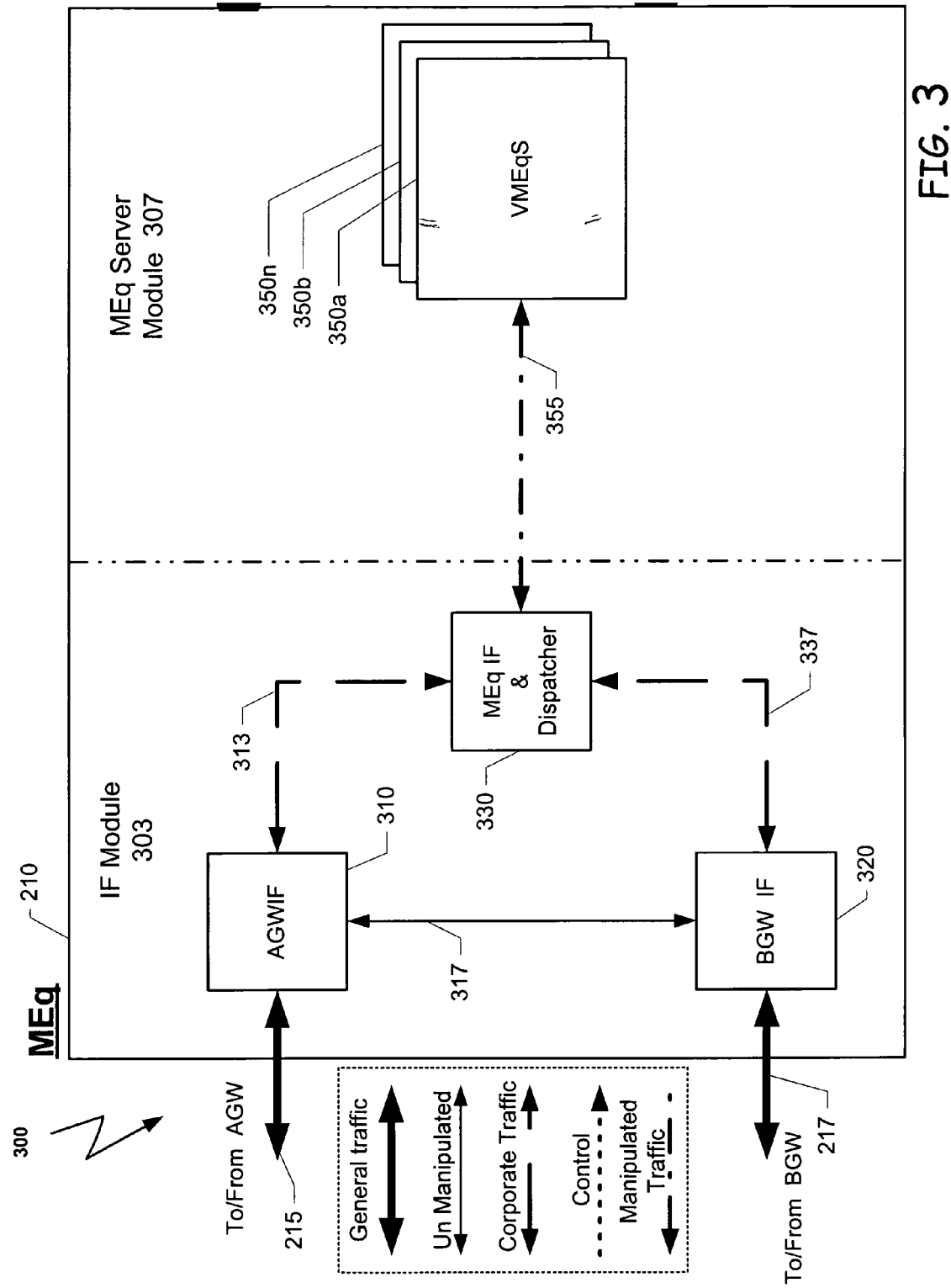
FIG. 3 is a block diagram of an exemplary MEq Farm 210 that could be employed in the exemplary embodiment illustrated in FIG. 2.

FIG. 3 is a block diagram of an exemplary MEq Farm 210 that could be employed in the exemplary embodiment illustrated in FIG. 2. The MEq 210 may include, but is not limited to, the following logical modules:

AGW Interface module (AGWIF) 310,
BGW Interface module (BGWIF) 320,
MEq Interface and Dispatcher module (MEqIF) 330, and
a plurality of Virtual MEq Servers (VMEqS) 350a to 350n.

Other embodiments may have other combinations of modules. For example, in one embodiment, the MEq Interface and Dispatcher module (MEqIF) 330 may be divided into two logical modules: MEq Interface module and Dispatcher module. Each logical module within the MEq 210 may be a software module or hardware module. All the modules may reside in one logical entity or may be spread over several logical entities that are connected over a LAN or by some other means. A logical entity may be a computer. The number of computers employed depends, at least in part, on the traffic at the operator's premises 1150. The system is scalable and may be upgraded when needed.

The MEq 210 can be viewed as having two major modules or module groupings. These major modules include the Interface module (IF module) 303 and the MEq Server module 307. Each of these major modules may reside in a different computer or in more than one computer. In addition, each major module may be manufactured by different or multiple vendors. The operation of an exemplary MEq 210 is disclosed below in reference with the direction of the packets.

Uplink Operation

Following is a description of the operation of an exemplary MEq 210 in uplink operation. In the uplink direction, all of the traffic from AGW 1158 (FIG. 2) to the Internet 1160 (FIG. 2) reaches MEq 210 as disclosed above in conjunction with FIG. 2. Traffic arriving at the MEq 210 via connection 215 first arrives at the AGWIF 310 Logical module. Among other things, the AGWIF 310 may check the encapsulation IP header (the header of the NBT packet) of each received packet to determine whether the packet belongs to a corporate intranet 1170 that is a user of the MEq 210. If the AGWIF 310 determines that a packet belongs to such a corporate intranet 1170, the AGWIF 310 transfers the packet over connection 313 to the MEqIF logical module 330 for manipulation. However, if the AGWIF 310 determines that the packet does not belong to a corporate intranet 1170 that is a user of the MEq 210, then the AGWIF 310 transfers the packet, as is, over connection 317 to the BGWIF logical module 320.

It should be noted that the operation of the AGWIF 310 depends on the topology of the MEq 210. If the topology is transparent, the source address of each received packet is the IP address of the AGW 1158 (FIG. 2) and the destination address is the address of the intended corporate intranet 1170, or any other destination address. Therefore, in an exemplary embodiment, the AGWIF logical module 310 may have a table of all the corporate intranets 1170 that are users of the MEq 210. Based on a comparison of the destination address with the contents of this table, the AGWIF 310 determines whether the packet will be transferred to the MEqIF 330 or to the BGWIF 320.

If the topology of the MEq 210 is such that it is terminating the tunnel, the source address of each received packet is the IP address of AGW 1158 but the destination address is the IP address of MEq 210. In this embodiment, the AGWIF 310 processes the header of the original packets to determine whether the destination address is the IP address of the MEq 210 or one of the VMEqS 350.

The tunneling protocol between the operator's premises 1150 and the corporate intranet 1170 may use an IP over IP protocol (such as RFC 1241 and RFC 1479) or a GRE protocol (such as RFC 1701, RFC 1702 and RFC 2784), an IEEE 802.1Q protocol (such as VLAN Tagging) or any similar protocol.

In other exemplary embodiments that utilize a clientless MEq option, the AGWIF logical module 310 may run an additional filter in the decision of whether to transfer the packet to the MEqIF 330 or the BGWIF 320. This filter may be based on the type of the packet. For example, if the packet is based on TCP/IP, then the packet may be transferred to the MEqIF 330 although the client doesn't have the client's side of the MEq 210 software. This particular exemplary embodiment is described in detail in conjunction with FIG. 5.

The MEqIF 330 receives packets that may require manipulation by the MEq 210, over connection 313. The MEqIF 330 processes the header of the original packet to determine whether the packet requires manipulations of the MEq Module to be conducted by the MEq Server module 307. This determination may be based, at least in part, on the destination address of the original packet.

If the destination address of the original packet is the IP address of the MEq 210, which means that the packet is a control packet. For instance, such a packet may be a request from a new remote client to start a new connection using the MEq 210. Then MEqIF 330 checks whether the corporation to which the new client belongs already has been assigned to one of the plurality of VMEqS 350. If so, in one exemplary embodiment, the MEqIF 330 may define a Source Ports Range Numbers (SPRN) associated with the new remote client, and instruct the appropriate VMEqS to use these source port numbers for the manipulated packets—the results of the packets that has have arrived from this new client. The address of the appropriate VMEqS and the SPRN, which defines the connection to the client, may be used later on during reconstructing the NBT between the MEq 210 and the BGW 1159. After instructing the appropriate VMEqS 350, the original control packet is transferred to the appropriate VMEqS 350, over IP connection 355 for further processing. If the corporation doesn't have a valid connection to one of the VMEqS 350, the MEqIF 330 creates a new instance—a new VMEqS that will be assigned to this corporation. This new VMEqS will have a new private IP. The MEqIF 330 then updates the VMEqS 350 with the SPRN of the new client and transfers the original packet to the new VMEqS 350 while keeping a record of this packet.

If the destination address of the original packet is the IP address of one of the VMEqS 350*a-n*, indicating that this packet belongs to an existing connection between the remote client and the MEq 210, then the original packet is transferred to the appropriate VMEqS 350 over IP connection 355. The MEqIF 330 keeps a record of this transfer in a cross-reference table. This record is used upon receiving the manipulated packet from the appropriate VMEqS 350*a-n*. The packet to be transferred to the appropriate VMEqS 350*a-n* has the source IP address of the client and the destination IP address of the appropriate VMEqS 350*a-n*. The record in the cross-reference table may include the destination address of the corporation, the IP address of the remote client (which may be a Private IP address of the client in its corporation), the IP address of the appropriate VMEqS 350 and the SPRN that has been assigned to this client in the VMEqS that has been assigned to the appropriate corporation. This data may be used when reconstructing the NBT in both directions.

Alternate exemplary embodiment may use a proprietary protocol over TCP/IP in order to communicate over connection 355, between the MEqIF 330 and the plurality of VMEqS 350*a-n*. In such embodiment the first packet that initiate a connection between the MEqIF 330 and one of the VMEqS 350*a-n* may contain information regarding the NBT that is handled by the VMEqS via this connection.

The access to the cross-reference table may be based on the type of connection 355 between MEqIF 330 and the plurality of VMEqS 350*a* to 350*n*. For example, an embodiment of the present invention may have a plurality of VMEqS 350*a-n*, wherein each VMEqS 350 may serve a corporation and each client of this corporation may receive a different source port range of numbers (SPRN). Therefore, in this exemplary embodiment, the access record in the cross-reference table for packets coming from the VMEqS 350a-n and being directed towards the BGW 1159, may be the IP address of the VMEqS 350 and the SPRN. For the responding packets coming from BGWIF 320, the access record in the cross-reference table for packets may be the IP address of the corporation (which defines the VMEqS) and the destination port number that defines the remote clients, verifying that it belongs to one of the ports in the SPRN that has been assigned to this client.

If the destination address in the original packet is not the IP address of either the MEq 210 or of one of the VMEqS 350a-n, then the MEqIF 330 transfers the packet over connection 337 to BGWIF 320. In other exemplary embodiments, which utilize a clientless MEq option, the MEqIF 330 logical module may run an additional filter in the decision of whether to manipulate the packet. This filter may be based on the type of the packet. For example, if the packet is based on TCP/IP, then the packet may be transferred to one of the VMEqS 350, which handles clientless traffic. A clientless VMEqS may handle traffic from terminals that do not have the MEq client software installed. More information about this method is disclosed below in conjunction with FIG. 5.

The MEqIF 330 receives the manipulated packet from the plurality of VMEqS 350a-n via IP connection 355. Each such packet has the source address of the appropriate VMEqS 350a-n with the source port number being within the range of the SPRN that is associated with the remote client and the destination address of the final entity in the corporation or in the Internet. Upon receiving a manipulated packet, the MEqIF 330 retrieves the appropriate record of this packet from the cross-reference table based, at least in part, on the IP address of the appropriate VMEqS 350a-n and the SPRN. Based on this information, the MEqIF 330 restores the NBT header with the source address of the AGW 1158 (FIG. 2) and the destination address of the corporation router or the site in the Internet. The MEqIF module 330 also reconstructs the internal packet and sets the source IP address to the remote client IP address and the destination address to the corporate or the Internet IP address. Then MEqIF 330 transfers the NBT packet over the connection 337 to BGWIF 320.

Other exemplary embodiment, which may be used in operator premises 1150 (FIG. 2) that is using VLAN TAG (802.1Q) as the NTB protocol, may transfer the TAG information in the first packet of each new connection over communication lines 355 between the MEqIF 330 and the appropriate VMEqS 350. The MEqIF 330 may keep this information (the TAG) in the cross-reference table as one of index parameters for the entry of this connection in the cross-reference table and uses it to restore the appropriate NBT for the manipulated packets that are received from the appropriate VMEqS 350.

Internally to the MEq 210, the BGWIF 320 receives untouched packets via connection 317 from the AGWIF 310 and manipulated packets via connection 337 from the MEqIF 330. If a packet is received via connection 317, the BGWIF 320 transfers the packet, as is, without any manipulations, to the BGW 1159 (FIG. 2) through communication path 217. If the packet has been received via connection 337 from the MEqIF 330 and if the topology of the MEq 310 is of the transparent type, the BGWIF 320 transfers the received packet, as is, to the BGW 1159 over communication path 217. The source address of such a packet is the AGW and the destination address is the IP address of the router of the corporation.

If the packet has been received via connection 337 from the MEqIF 330 and the topology of the MEq 310 is the terminating topology, the BGWIF 320 changes the address in the header of the NBT packet by changing the source address to the IP address of the MEq 210 and the destination address to the IP address of the corporation router, which has been configured into the BGWIF 320 during the installation procedure.

Downlink Operation

Following is a description of the operation of an exemplary MEq 210 in downlink operation. In the downlink direction, packets received from the Internet 1160, or directly from a corporation intranet, such as 1170k, reach the operator's premises 1150 via BGW 1159 (FIG. 2). These packets are transferred to the MEq 210 over communication path 217 and are received by the BGWIF logical module 320. The BGWIF 320 performs similar task as the AGWIF 310 when it receives packets in that it sorts the received packets into two groups, packets that may be manipulated by the MEq 210 and untouchable packets. The BGWIF 320 checks the encapsulation IP header (the header of the NBT) of each received packet, or the TAG in case that the NBT is based on VLAN TAG (802.1Q), and determines whether it should be manipulated by the MEq 210. This decision may be based, at least in part, on searching the source address of the NBT packets in the list of the IP addresses of the routers of the corporations that are currently communicating with one of the VMEqS 350. This search is done in a copy of the updated cross-reference table, which is delivered from the MEqIF 330.

In alternate exemplary embodiment, in which the communication is based on VLAN TAG, the tag is used in the cross reference table instead of the source address of the NBT packet.

In other exemplary embodiments, the BGWIF 320 may process the header of the original packet and check whether the destination address of the original packet belongs to one of the VMEqS 350. If so, the BGWIF 320 then transfers the packet over connection 337 to the MEqIF 330. Otherwise, the BGWIF 320 transfers the packet, as is, over connection 317 to the AGWIF 310.

In other exemplary embodiments that utilize a clientless MEq option, the MEqIF logical module 330 may run an additional filter in the decision of whether to manipulate the packet. This filter may be based, at least in part, on the type of the packet. For example if the packet is based on TCP/IP, then the packet may be manipulated and therefore it is transferred to a VMEqS that handles clientless traffic.

An exemplary MEqIF 330 may process the header of the original packet. This process may involve checking the destination address and the destination port number. If the destination address is the IP address of one of the plurality of VMEqS 350, which indicates that this packet belongs to an existing connection between a remote client and the MEq 210, then the original packet is transferred to the appropriate VMEqS 350 over IP connection 355. Then the present invention may determine to which SPRN the destination port number fits. The appropriate SPRN indicates which client is the final destination for this packet. The MEqIF 330 keeps a record of this packet in the cross-reference table.

This record includes the IP address of the router of the corporation and the private IP address of the client. This record is used when reconstructing the NBT after the manipulation of the appropriate VMEqS 350a-n. The packet to be transferred to the appropriate VMEqS 350a-n has the source IP address of the corporation and the destination IP address of the appropriate VMEqS 350a-n with the DST (Destination) port number being in the range of the SPRN that is associated with the remote client.

The cross-reference table that the MEqIF 330 keeps may have the IP addresses of all currently operating VMEqS 350, the IP address of the router of the corporations that are associated with the VMEqS 350, the IP address (which may also be private addresses) of the remote clients that are associated with said the VMEqS 350 and the SPRN that is associated with said the client.

If the destination address in the original packet is not the IP address of one of the VMEqS 350a-n, then MEqIF 330 transfers the packet over connection 313 to AGWIF 310. In other exemplary embodiments, which utilize the clientless MEq option, the MEqIF 330 logical module 310 may apply an additional filter in the decision as to whether or not to manipulate the packet. This filter may be based, at least in part, on the type of the packet. For example, if the packet is based on TCP/IP, then the packet may be transferred to a VMEqS 350 that handles clientless traffic.

The MEqIF 330 receives the manipulated packets from VMEqS 350a-n via connection 355. Each packet received has the source address of the appropriate VMEqS 350. The destination address of this packet is the IP address of the remote client, which may be added by the VMEqS 350.

Other embodiments may use a common source port number in the direction from the VMEqS 350a-n to the remote clients, since the VMEqS 350 uses the DST address as the IP address of the remote client and the VMEqS 350 private address as indicating the corporation to which the client belongs. These two addresses are sufficient to define the appropriate entry in the cross-reference table for reconstructing the NBT packet.

In other embodiments, in which the VMEqS 350a-n does not have a unique IP address, the MEqIF 330 may use a mapping table to retunnel the NBT packet. This mapping may be based, at least in part, on the source port numbers. Upon receiving a manipulated packet, the MEqIF 330 retrieves the appropriate record of this packet and restores the header of the NBT packet. In the NBT header, the source IP address is the corporation's router that is associated with the VMEqS 350, and the destination address is the IP address of AGW 1158. Then MEqIF 330 transfers the packet over connection 313 to AGWIF 310.

In alternate exemplary embodiment, in which the NBT connection is based on VLAN TAG, the tag may replace the address of the corporation router in the NBT header.

Internally to the MEq 210, the AGWIF 310 receives untouched packets from the BGWIF 320 via connection 317 and manipulated packets from the MEqIF 330 via connection 313. If the packet is received via connection 317, the AGWIF 310 transfers the packet, as is, over communication path connection 215 to the AGW 1158 (FIG. 2). If the packet has been received via connection 313 and, if the topology is transparent, the AGWIF 310 transfers the received packet, from the MEqIF 330, as is, to AGW 1158 over communication path connection 215. The source address of such a packet is the corporation's router and the destination address is the IP address of the AGW 1158. If the topology is terminating topology, the AGWIF 310 changes the address in the tunnel header so that, the source address is replaced with the IP address of the MEq 210 and the destination address is replaced with the IP address of the AGW 1158.

In alternate exemplary embodiment, in which the NBT connection is based on VLAN TAG, the tag may replace the address of the corporation router in the NBT header.

An exemplary embodiment of a MEq Server Module 307 may include, but is not limited to, one or more Virtual MEq Servers (VMEqS) 350a-350n. The VMEqSs 350 are created and managed by the MEqIF module 330. The MEqIF 330 may generate and control a plurality of instances of the VMEqSs 350a to 350n. Each such instance acts as a VMEqS that manipulates data communication.

An exemplary MEq server 307 may be from the NettGain Product Family Line, which is sold by Flash Networks. Such a MEq may operate to accelerate the communication, personalize the context, serve as a front end application server, etc. Each VMEqS is a logical entity that may have a private IP address. The MEqIF 330 may assign the private IP address. Each VMEqS 350 may serve a plurality of remote clients that are associated with the same corporation. A unique source port range (SPRN) may be used to represent each remote client, thereby distinguishing the different remote clients of a corporation that are currently communicating with their corporation. The VMEqS 350 may establish a tunnel connection over IP to each of the current remote clients and maintain the connection as long as the communication with the client exists.

In other exemplary embodiments, in which a proprietary protocol is used over connection line 355 (FIG. 3), the functionality of the SPRN may be replaced by a first packet that initiates the connection between MEqIF 330 and the appropriate VMEqS 350 that will be associated with the remote client and its corporation. The first packet may include information regarding this connection. Information that may be used to restore the NBT packet.

In an alternate exemplary embodiment, a permanent VMEqS may be assigned for each one of the corporations that are the users of MEq 210. Other exemplary embodiments may generate and keep alive a VMEqS for as long as there is at least one remote client that is currently connected to it. The detailed operation of the MEq 210 is described below in conjunction with the flow charts of FIG. 5 and FIG. 6.

Some of the exemplary embodiments may manipulate communication to terminals that do not have client MEq software. These embodiments may have at least one VMEqS that handles clientless traffic. This type of VMEqS may manipulate the data in a way that it will be transparent to the other side of the communication, although the manipulated packet has less data than the original packet. For example, it may re-compress JPEG files, as it is disclosed in PCT application number PCT/IL02/00052 and has been published on Aug. 1, 2002 having the international publication number WO02/060106, the contents of which is incorporated herein by reference. A variety of accelerating operations and the manipulation methods can be employed by the VMEqS in various embodiments of this invention. And although the present invention concentrates on the methods of breaking, managing and reconstructing a plurality of Compulsory Tunnels in a way that enables data manipulation and acceleration, the present invention should not be limited to the use of any specific accelerating operations or manipulation methods.

Figure 4:
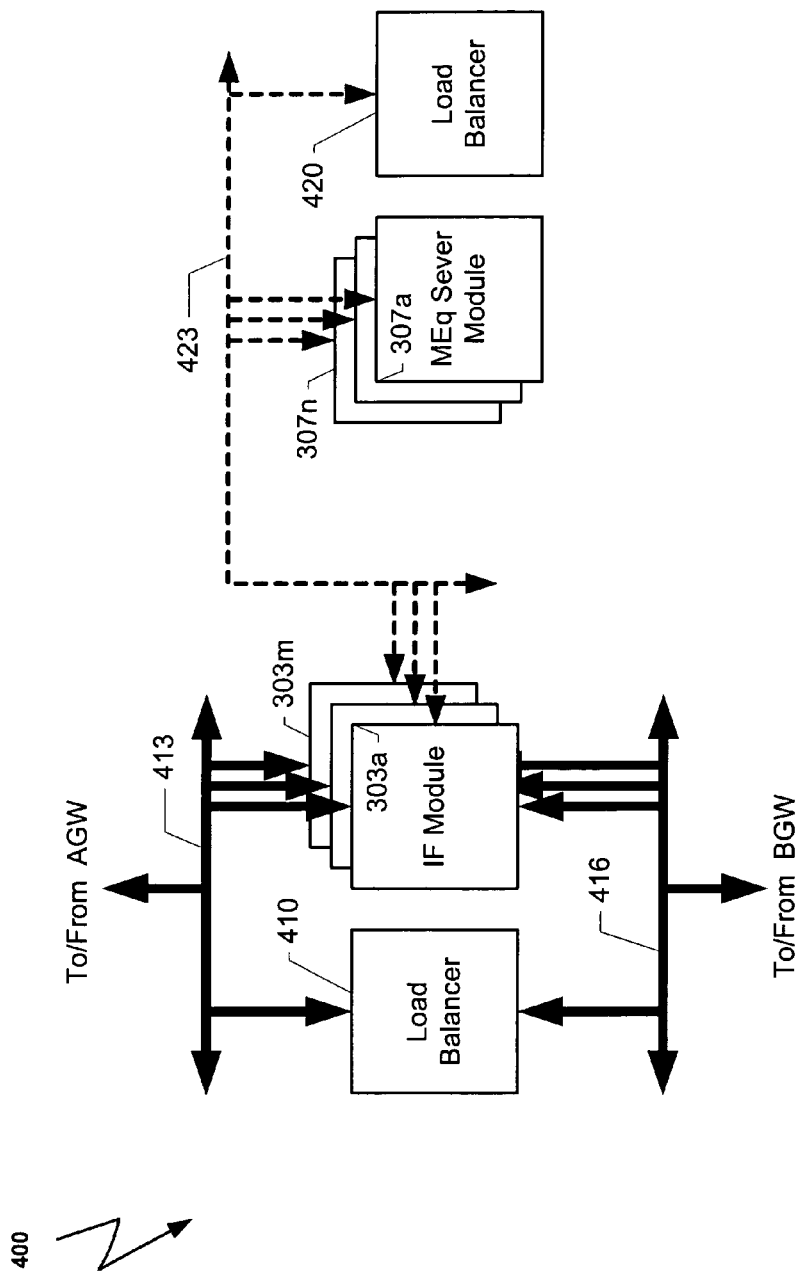
FIG. 4 is a block diagram illustrating another exemplary embodiment of an MEq Farm.

FIG. 4 is a block diagram illustrating another exemplary embodiment of an MEq Farm. This embodiment of the MEq Farm 400 is most useful when installed in an operator's premises that have a high transportation of data between the wireless network and the Internet. The AGW 1158 (FIG. 2) is connected to the MEq Farm 400 over LAN 413 and interfaces to one or more IF Module Servers 303a to 303m and to a Load Balancer Server (LBS) 410. The BGW 1159 is connected to the MEq Farm 400 over LAN 416 and also interfaces to the IF Module Servers 303a to 303m and to the Load Balancer Server (LBS) 410. The LBS 410 may be a common LBS that distributes the transportation between the AGW 1158 and the BGW 1159 among the IF Module Servers 303a to 303m. One exemplary embodiment of LBS 410 may be a server that distributes the traffic according to the corporations. The LBS 410 may assign a group of corporations to each one of the IF Module Servers 303. Each one of the IF Module Servers, 303a to 303m, manipulates the transportation that has been associated with it as described above in conjunction to FIG. 3 and sends the appropriate packets over LAN 423 to be further processed by additional MEq Server Modules 307a to 307n. Another LBS 420 is connected to LAN 423 for distributing the traffic among the additional MEq Server Modules 307.

An exemplary embodiment of LBS 420 may also be a server that distributes the traffic according to the corporations. The LBS 420 may assign a group of corporations to each of the MEq Server Modules 307. Other exemplary embodiments may use the MEqIF module as the LBS 410. The additional MEq Server Modules 307a to 307n manipulate the transportation that has been associated with it as described above in conjunction to FIG. 3 and send back the manipulated packets over LAN 423 to the appropriate IF Server Modules 303a to 303m. Each MEq Server Module 307 may comprise a plurality of VMEqS 350.

Figure 5A:
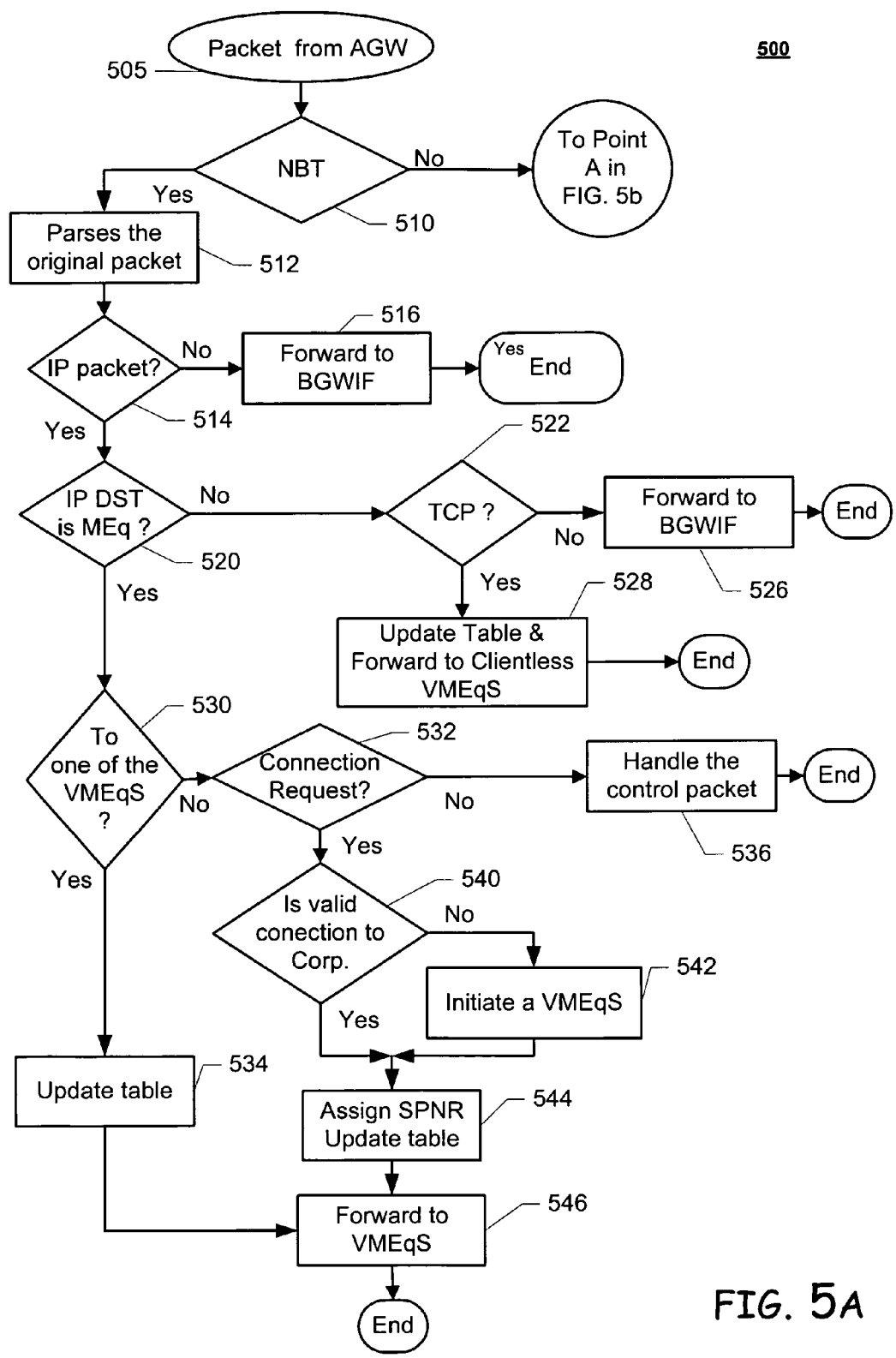
FIGS. 5a and 5b are flow charts that illustrate an exemplary method that may be used by an IF Server Module (FIG. 3) for handling packets coming from an AGW (FIG. 2).
Figure 5B:
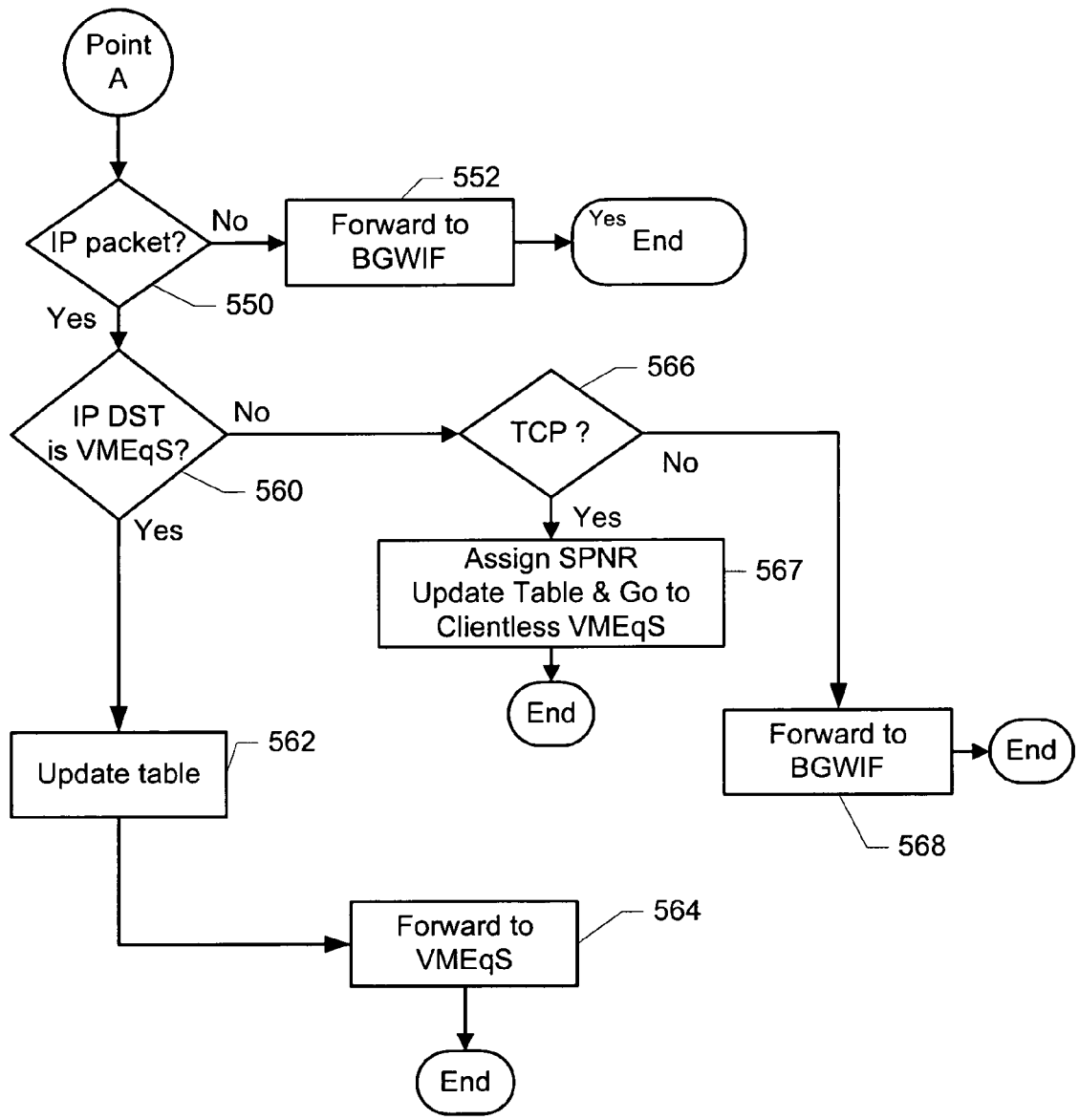

FIGS. 5a and 5b are flow charts that illustrate an exemplary method that may be used by an IF module 303 for handling packets coming from an AGW. Upon receiving a packet from the AGW 1158, at step 510, the IF Server Module 303 checks whether the received packet belongs to a Network Based Tunnel such as a compulsory tunnel. This step is performed by checking whether it the packet is based on NBT Protocols such as "GRE", "IP over IP", VLAN TAG (802.1Q) etc., and thus is an NBT packet. The NBT Protocol is chosen by the Operator. Generally a single type of NBT protocol is used at a certain operator's premises. If the received packet is not an NBT packet, processing continues at point A in FIG. 5b. If the received packet is an NBT packet, at step 512 the original packet, the packet that is encapsulated in the NTB packet, is parsed and at step 514 it is determined whether the original packet is an IP packet. If the original packet is not an IP packet, at step 516 the NTB packet is transferred, as is, to the BGWIF 320 (FIG. 3). Thus, it is evident that this embodiment of the present invention accelerates only original IP packets. Other embodiments of the present invention may accelerate other types of original packets and the present invention should not be limited to an embodiment that only works on original IP packets. After the NBT packet is sent 516 to the BGWIF 320, and processing is terminated.

If at step 514 it is determined that the original packet is an IP packet, then a decision is made at step 520 whether the Destination Address (DST) is the IP address of the MEq 210 (FIGS. 2 & 3). If the DST is not the IP address of the MEq 210, this indicates that the remote terminal does not have the client version of the manipulating software. However an exemplary embodiment may manipulate part of the clientless transportation, for example, TCP packets may be accelerated. This exemplary embodiment operates to filter this type of transportation by determining whether the original packet is a TCP packet at step 522. If the packet is a TCP packet, the IF Module 303 assigns an SPRN that is associated with this terminal, then the cross-reference table is updated with the new connection using the IP address of the terminal (it can be the private IP address), the assigned SPRN, the IP address of the corporate intranet and the private IP address of the clientless VMEqS that will handle this connection. Next, the IF Module 303 instructs the appropriate VMEqS regarding the assigned SPRN and at step 528, forwards the packet to the appropriate clientless VMEqS 350 over connection 355 (FIG. 3). After the packet is forwarded to the appropriate VMEqS 350, the processing of IF module 303 is terminated.

If at step 522 it is determined that the original packet is not a TCP packet, then at step 526 the NBT packet is forwarded to the BGW 1159 (FIG. 2) via the BGWIF 320 (FIG. 3). This exemplary embodiment of the present invention operates to manipulate only TCP packets; however, those skilled in the art will understand that the present invention could operate to manipulate other types of original packets and the present invention should not be limited to only performing such operations on TCP packets. After the NBT packet is forwarded to the BGW 1159 processing is terminated.

If at step 520 it is determined that the DST address belongs to MEq 210, a decision is made at step 530 whether the DST address belongs to a VMEqS. If the DST address belongs to a VMEqS, this indicates that the current packet belongs to an existing connection between the remote client and an appropriate VMEqS. Then at step 534, the IF Module 303 updates the cross-reference table with the new packet and at step 546 it forwards the packet to the appropriate VMEqS 350, for further processing, using communication lines 355 (FIG. 3). After the packet is forwarded to the appropriate VMEqS 350, the processing of IF module 303 is terminated.

If at step 530 it is determined that the DST address of the packet is not a privet address of one of the VMEqS, processing continues at step 532 where it determines whether the packet is a request of a remote client to use the manipulation services of MEq 210 (FIGS. 2 & 3). If the packet is not such a request, the packet is a control packet and at step 536 the MEq 210 handles the control packet. If the packet is such a request to use the manipulation services, at step 540 it is determined whether the corporation, to which the remote client belongs, is associated with an existing VMEqS 350a-n (FIG. 3). If the corporation is associated with an existing VMEqS, at step 544 the IF Module 303 (FIG. 3) defines the SPRN that will be associated with this client and, updates the cross-reference table with the new connection using the IP address of the client (it can be the private IP address), the assigned SPRN, the corporation IP address and the private IP address of the appropriate VMEqS that will handle this connection. At step 546, the IF Module 303 then operates to instruct the appropriate VMEqS regarding the SPRN and forwards the packet to the appropriate VMEqS 350 over connection 355 (FIG. 3).

If at step 540 it is determined that the corporation does not have a valid VMEqS associated with it, at step 542 the IF Module 303 creates a new instance, or a new VMEqS, and assigns it to the corporation of the new client and continues processing at step 544.

Other exemplary embodiments may define the connection with a certain remote client in the first packet of the connection with the selected VMEqS 350 over communication 355 instead of using the SPRN.

Alternate exemplary embodiment that is used in networks, in which the NBT is based on VLAN TAG (802.1Q) protocol, the TAG information may be used to define the connection instead of the address of the router of the corporation.

Returning to step 510, if it is determined that the received packet is not an NBT packet, the present invention continues at point A in FIG. 5b. At step 550 (FIG. 5b), the received packet is examined to determine whether the received packet is an IP packet. If the received packet is not an IP packet, at step 552 the received packet is transferred, as is, to the BGW 1159 (FIG. 2) via the BGWIF 320 (FIG. 3). In an exemplary embodiment of the present invention, only IP packets are manipulated. However, it should be understood that other embodiments may manipulate other types of packets. After forwarding the received packet to the BGWIF, processing is then terminated.

If at step 550 it is determined that the received packet is an IP packet, then at step 560 it is determined whether the Destination Address (DST) is the IP address of one of the VMEqS. If the DST is not the IP address of one of the VMEqSs, the exemplary embodiment continues at step 566 to determine if the received packet is a TCP packet and then may manipulate TCP packets. If the packet is a TCP packet, at step 567 the present invention operates to assign an SPRN to the communication with this client and update the cross-reference table with the new connection using the IP address of the client, the assigned SPRN, and the private IP address of the clientless VMEqS that will handle this connection. Finally, the IF Module 303 instructs the appropriate VMEqS about the SPRN and forwards the packet to the appropriate clientless VMEqS 350 over connection 355 (FIG. 3). After the packet is forwarded to the appropriate VMEqS 350, the processing of IF module 303 is terminated. If at step 566 it is determined that the received packet is not a TCP packet, at step 568 the received packet is forwarded, as is, to the BGW 1159 (FIG. 2) via the BGWIF 320 (FIG. 3) and processing is terminated.

If at step 560 it is determined that the DST address is one of the VMEqSs, this is an indication that the current packet belongs to an existing connection between the remote client and the appropriate VMEqS. At step 562, the IF Module 303 updates the cross-reference table with the new received packet and at step 564, the IF Module 303 forwards the received packet to the appropriate VMEqS 350 for further processing using communication lines 355 (FIG. 3). After the packet is forwarded to the appropriate VMEqS 350, the processing of IF module 303 is terminated.

Figure 6A:
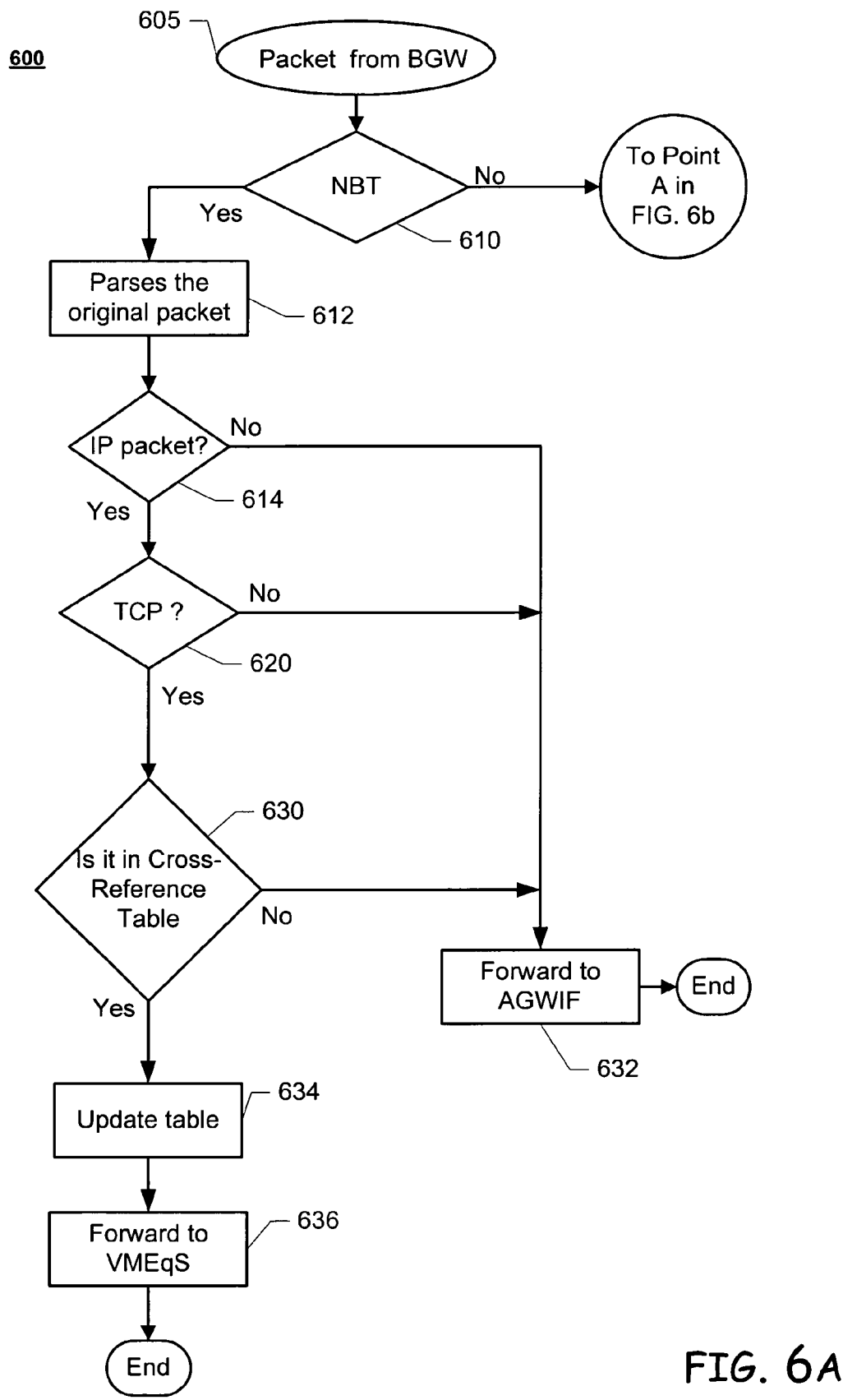
FIGS. 6a and 6b are flow charts that illustrate an exemplary method that may be used by an IF Module (FIG. 3) for handling packets coming from a BGW (FIG. 2).
Figure 6B:
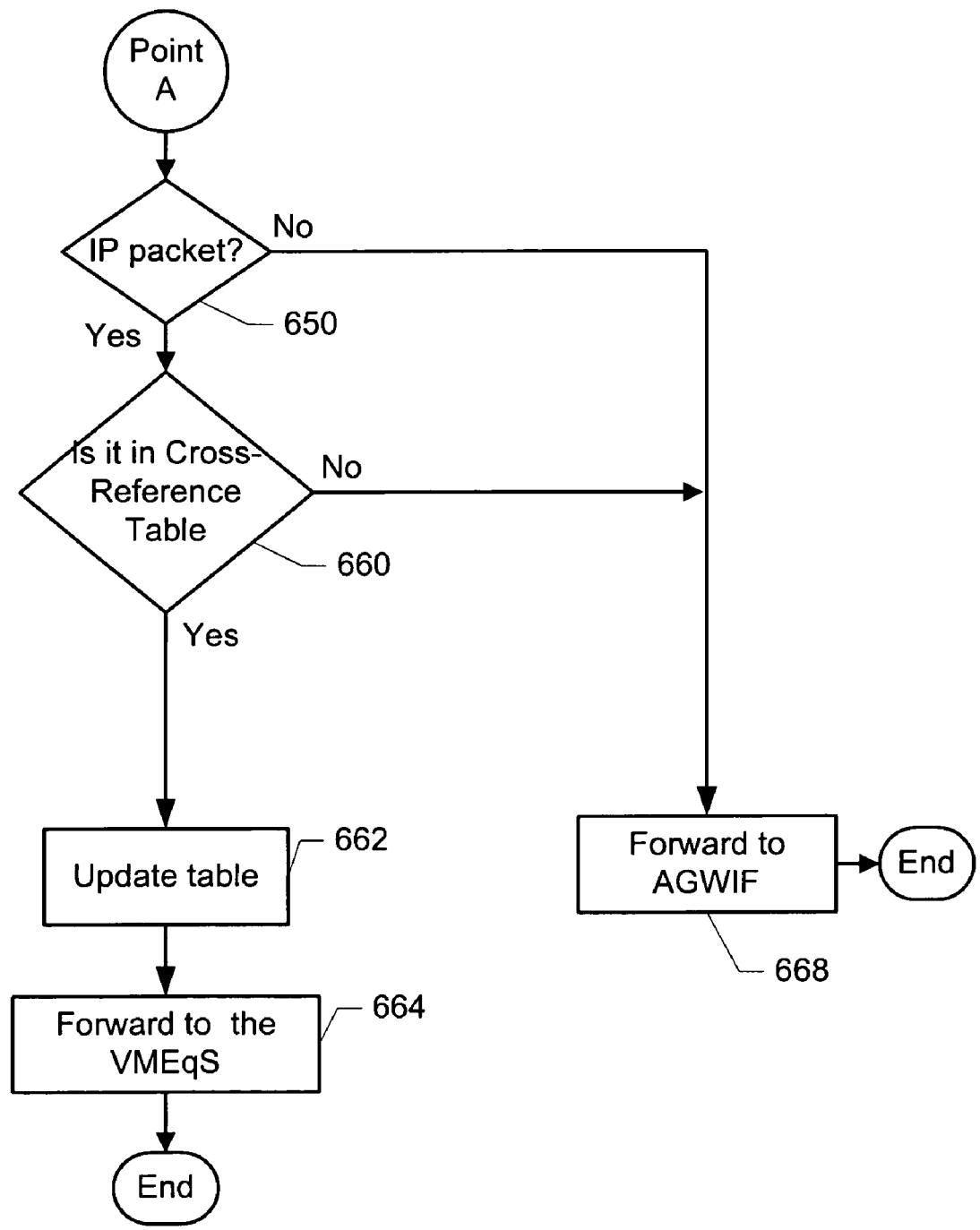

FIGS. 6*a* and 6*b* are flow diagrams that illustrate an exemplary method that may be used by an IF Module 303 (FIG. 3) for handling packets coming from a BGW. Processing begins at step 605 upon receiving a received packet from the BGW 1159. At step 610 the IF Module 303 checks whether the received packet belongs to an NBT (such as a compulsory tunnel) packet, by checking whether the received packet is based on NBT Protocols, such as "GRE", IEEE 802.1Q, or "IP over IP", etc. If the received packet is not an NBT packet, processing continues at point A in FIG. 6*b*. If the received packet is an NBT packet, processing continues at step 612 where the original packet, the packet that is encapsulated in the NBT packet, is parsed. At step 614 it is determined whether the original packet is an IP packet. If the original packet is not an IP packet, processing continues at step 632 where the NBT packet is transferred, as is, to the AGWIF 310 (FIG. 3). The exemplary embodiment only manipulates IP packets; however, it should be understood that in other embodiments, the present invention may operate to manipulate other types of packets. After forwarding the NBT packet to the AGWIF 310, processing is terminated.

If at step 614 it is determined that the original packet is an IP packet, then processing continues at step 620 where it is determined whether the original packet is a TCP packet. If the original packet is not a TCP packet, processing continues at step 632 where the NBT packet is transferred to the AGW 1158 (FIG. 2) via AGWIF 310 (FIG. 3). After forwarding the NBT packet to the AGWIF 310, processing is terminated.

If at step 620 it is determined that the original packet is a TCP packet, then processing continues at step 630 where it is determined whether this connection belongs to one of the VMEqS 350 (FIG. 3) by examining the cross-reference table. If the connection belongs to one of the VMEqSs 350, this is an indication that the current packet belongs to an existing communication between a remote client and it's corporation via the appropriate VMEqS. Then IF Module 303 proceeds at step 634 to update the cross-reference table with the new packet using the corporate IP address, the client private address (based on the DST ports that indicates the port numbers range that has been assigned to a specific client, which is derived from the SPRN that has been assigned to the remote client) and at step 636 the original packet is forwarded to the appropriate VMEqS 350, for further processing, using communication lines 355 (FIG. 3). After the original packet is forwarded to the appropriate VMEqS 350, the processing of IF module 303 is terminated.

Alternate exemplary embodiment, in which the NBT is based on VLAN TAG, the tag information may be used in conjunction with the information that is stored in the cross reference table.

If at step 630 the connection characteristic carried by this packet are not found in the cross reference table then the processing continues at step 632 where the NBT packet is transferred to the AGW 1158 (FIG. 2) via AGWIF 310 (FIG. 3).

Returning to the case in which the received packet is not an NBT packet 610, the present invention continues to operate at point A in FIG. 6*b*. At step 650 in FIG. 6*b* it is determined whether the received packet is an IP packet. If the received packet is not an IP packet, processing continues at step 668 where the received packet is transferred, as is, to the AGW 1158 (FIG. 2) via the AGWIF 310 (FIG. 3) and processing is terminated.

If at step 650 it is determined that the received packet is an IP packet, processing continues at step 660 where it is determined whether the connection belongs to one of the VMEqS 350. The decision is based, at least in part, on the cross-reference table. If the connection does not belong to a VMEqS 350, processing continues at step 668 where the received packet is transferred, as is, to the AGW 1158 (FIG. 2) via the AGWIF 310 (FIG. 3) and processing is terminated.

If at step 660 the connection does belong to a VMEqS, this indicates that the current received packet belongs to an existing communication between the remote client and the appropriate VMEqS. At step 662, the IF Module 303 updates the cross-reference table with the new received packet and at step 664 it forwards the received packet to the appropriate VMEqS 350 for further processing using communication lines 355 (FIG. 3). After the packet is forwarded to the appropriate VMEqS 350, the processing of IF module 303 is terminated. Since there are some network security methods that may use the source port number as a filter to remove hostile communication, some embodiments of the present invention may convert the unique port number, which is in the range of the appropriate SPRN, to a common port number. These methods may use a hashing method to generate a table that keeps the parameters of this connection and enables converting the DST port number of the received packets from the corporations before transferring them to the appropriate VMEqS. This conversion and the table may be done and used by the BGWIF logical module 320.

The present invention is not limited to methods using a unique approach for indicating the remote client, like but not limited to the SPRN method. Other exemplary embodiments of the present invention may use a common TCP or UDP connection over IP communication line 355 between IF module 303 and MEq Server Module 307 (FIG. 3). In such embodiments, the VMEqS may declare the remote client IP address each time that it establishes a TCP connection toward the BGW 1159 (FIG. 2). Such an embodiment demands a synchronization between the VMEqS and the IF module.

Thus, when a VMEqS intends to initiate a new connection (for example a TCP connection) toward the BGW 1159, it first sends information about this connection to the IF Module 303. This information may include the required parameters to be used in the cross-reference table. For example, the final DST IP number in the corporation, the VMEqS IP address as the source address, the DST port at the corporation and the source port in the VMEqS, which may be a common source port, and the IP address of the remote client that may be its private IP address in the corporation, tag information in case of using VLAN TAG protocol.

Some exemplary embodiments may use a clientless VMEqS for each corporation and one or more clientless VMEqS for remote clients that do not belong to any corporation.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention may be implemented by any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of skilled in the art. The scope of the invention is limited only by the following claims.

What is claimed is:

1. A method for manipulating, via manipulation equipment residing within an access network to the Internet, the transportation of packets between a plurality of remote clients on one side of the access network and a plurality of corporate intranets on another side of the access network, the method comprising the steps of:
   (a) intercepting network based tunnel (NBT) packets transferred between a plurality of remote clients and a plurality of corporate intranets through a plurality of network based tunnels that carry data traffic between a plurality of remote clients and a plurality of corporate intranets, wherein at least two of the remote clients are in communication with different corporate intranets;
   (b) parsing an intercepted NBT packet that was directed toward a destination on one side of the access network and retrieving an original packet that is encapsulated within the NBT packet;
   (c) parsing the original packet; and
   (d) wherein the original packet is determined to have been targeted toward the manipulation equipment:
      (i) updating a cross-reference table, the cross-reference table containing information that is useful for reconstruction of an NBT;
      (ii) manipulating the original packet into a manipulated packet by sending the original packet to the manipulation equipment;
      (iii) reconstructing, via the updated cross-reference table the NBT connection from which the NBT packet was intercepted; and
      (iv) transferring the manipulated packet toward the destination over the reconstructed NBT connection;
   (e) wherein the step of reconstructing the NBT connection further comprises using a source port number of the received packet coming from the manipulation equipment.

2. The method of claim 1, wherein determining whether an original packet is targeted toward the manipulation system is based on the destination address of the original packet.

3. A method for manipulating, via manipulation equipment residing within an access network to the Internet, the transportation of packets between a plurality of remote clients on one side of the access network and a plurality of corporate intranets on another side of the access network, the method comprising the steps of:
   (a) intercepting network based tunnel (NBT) packets transferred between a plurality of remote clients and a plurality of corporate intranets through a plurality of network based tunnels that carry data traffic between a plurality of remote clients and a plurality of corporate intranets, wherein at least two of the remote clients are in communication with different corporate intranets;
   (b) parsing an intercepted NBT packet that was directed toward a destination on one side of the access network and retrieving an original packet that is encapsulated within the NBT packet;
   (c) parsing the original packet; and
   (d) wherein the original packet is determined to have been targeted toward the manipulation equipment:
      (i) updating a cross-reference table, the cross-reference table containing information that is useful for reconstruction of an NBT;
      (ii) manipulating the original packet into a manipulated packet by sending the original packet to the manipulation equipment;
      (iii) reconstructing, via the updated cross-reference table, the NBT connection from which the NBT packet was intercepted; and
      (iv) transferring the manipulated packet toward the destination over the reconstructed NBT connection;
   (e) wherein the step of updating the cross-reference table further comprises using the IP address of the manipulation equipment.

4. The method of claim 3, wherein determining whether an original packet is targeted toward the manipulation system is based on the destination address of the original packet.

5. A method for manipulating, via manipulation equipment residing within an access network to the Internet, the transportation of packets between a plurality of remote clients on one side of the access network and a plurality of corporate intranets on another side of the access network, the method comprising the steps of:
   (a) intercepting network based tunnel (NBT) packets transferred between a plurality of remote clients and a plurality of corporate intranets through a plurality of network based tunnels that carry data traffic between a plurality of remote clients and a plurality of corporate intranets, wherein at least two of the remote clients are in communication with different corporate intranets;
   (b) parsing an intercepted NBT packet that was directed toward a destination on one side of the access network and retrieving an original packet that is encapsulated within the NBT packet;
   (c) parsing the original packet; and
   (d) wherein the original packet is determined to have been targeted toward the manipulation equipment:
      (i) updating a cross-reference table, the cross-reference table containing information that is useful for reconstruction of an NBT;

(ii) manipulating the original packet into a manipulated packet by sending the original packet to the manipulation equipment;

(iii) reconstructing, via the updated cross-reference table, the NBT connection from which the NBT packet was intercepted; and (iv) transferring the manipulated packet toward the destination over the reconstructed NBT connection;

(e) wherein the step of updating the cross-reference table further comprises using the IP address of the destination.

6. The method of claim 5, wherein determining whether an original packet is targeted toward the manipulation system is based on the destination address of the original packet.

7. A method for manipulating, via manipulation equipment residing within an access network to the Internet, the transportation of packets between a plurality of remote clients on one side of the access network and a plurality of corporate intranets on another side of the access network, the method comprising the steps of:

(a) intercepting network based tunnel (NBT) packets transferred between a plurality of remote clients and a plurality of corporate intranets through a plurality of network based tunnels that carry data traffic between a plurality of remote clients and a plurality of corporate intranets, wherein at least two of the remote clients are in communication with different corporate intranets;

(b) parsing an intercepted NBT packet that was directed toward a destination on one side of the access network and retrieving an original packet that is encapsulated within the NBT packet;

(c) parsing the original packet; and (d) wherein the original packet is determined to have been targeted toward the manipulation equipment:

(i) updating a cross-reference table, the cross-reference table containing information that is useful for the reconstruction of an NBT;

(ii) manipulating the original packet into a manipulated packet by sending the original packet to the manipulation equipment;

(iii) reconstructing, via the updated cross-reference table, the NBT connection from which the NBT packet was intercepted; and (iv) transferring the manipulated packet toward the destination over the reconstructed NBT connection;

(e) wherein the step of updating the cross-reference table further comprises using the IP address of the source.

8. The method of claim 7, wherein determining whether an original packet is targeted toward the manipulation system is based on the destination address of the original packet.

9. A method for manipulating the transportation of original packets transported via an access network to the Internet between a plurality of remote clients and a plurality of IP based private data networks, wherein the original packets are encapsulated in network based tunnel packets, and wherein the manipulation is done at the access network service provider's premises, the method comprising the steps of:

intercepting, at the access network service provider's premises, the transportation between the plurality of remote clients and the plurality of IP based private data networks, wherein at least two of the remote clients are in communication with different IP based private data networks;

parsing a received network based tunnel packet to determine if its encapsulated original packet is targeted toward a manipulation system;

forwarding the received network based tunnel packet, as is, towards a destination if the encapsulated original packet is not targeted toward the manipulation system;

if the encapsulated original packet is targeted toward the manipulation system, then:

retrieving the original packet out of the network based tunnel packet;

updating a cross-reference table with parameters that associate the original packet with the received network based tunnel packet, the cross-reference table enabling the reconstruction of a manipulated network based tunnel packet that will be transferred to the destination after the manipulation of the received original packet;

transferring the original packet toward the manipulation system;

manipulating the original packet into a manipulated original packet;

reconstructing the manipulated network based tunnel packet with the manipulated original received packet; and transferring the manipulated network based tunnel packet to the destination over network based tunnels;

wherein the step of updating the cross-reference table further comprises using parameters, wherein the parameters that are used comprise a source port number of packets coming from the manipulation system.

10. The method of claim 9, wherein determining whether an original packet is targeted toward the manipulation system is based on the destination address of the original packet.

11. A method for manipulating the transportation of original packets transported via an access network to the Internet between a plurality of remote clients and a plurality of IP based private data networks, wherein the original packets are encapsulated in network based tunnel packets, and wherein the manipulation is done at the access network service provider's premises, the method comprising the steps of:

intercepting, at the access network service provider's premises, the transportation between the plurality of remote clients and the plurality of IP based private data networks, wherein at least two of the remote clients are in communication with different IP based private data networks;

parsing a received network based tunnel packet to determine if its encapsulated original packet is not targeted toward the manipulation system;

forwarding the received network based tunnel packet, as is, towards a destination if the encapsulated original packet is not targeted toward a manipulation system;

if the encapsulated original packet is targeted toward the manipulation system, then:

retrieving the original packet out of the network based tunnel packet;

updating a cross-reference table with parameters that associate the original packet with the received network based tunnel packet, the cross-reference table enabling the reconstruction of a manipulated network based tunnel packet that will be transferred to the destination after the manipulation of the received original packet;

transferring the original packet toward the manipulation system;

manipulating the original packet into a manipulated original packet;

reconstructing the manipulated network based tunnel packet with the manipulated original received packet; and transferring the manipulated network based tunnel packet to the destination over network based tunnels;

wherein the step of updating the cross-reference table further comprises using parameters, wherein the parameters that are used for updating the cross-reference table comprise the IP address of the manipulation system.

12. The method of claim 11, wherein determining whether an original packet is targeted toward the manipulation system is based on the destination address of the original packet.

13. A method for manipulating the transportation of original packets transported via an access network to the Internet between a plurality of remote clients and a plurality of IP based private data networks, wherein the original packets are encapsulated in network based tunnel packets, and wherein the manipulation is done at the access network service provider's premises, the method comprising the steps of:

intercepting, at the access network service provider's premises, the transportation between the plurality remote clients and the plurality of IP based private data networks, wherein at least two of the remote clients are in communication with different IP based private data networks;

parsing a received network based tunnel packet to determine if its encapsulated original packet is targeted toward a manipulation system;

forwarding the received network based tunnel packet, as is, towards a destination if the encapsulated original packet is not targeted toward the manipulation system;

if the encapsulated original packet is targeted toward the manipulation system, then:

retrieving the original packet out of the network based tunnel packet;

updating a cross-reference table with parameters that associate the original packet with the received network based tunnel packet, the cross-reference table enabling the reconstruction of a manipulated network based tunnel packet that will be transferred to the destination after the manipulation of the received original packet;

transferring the original packet toward the manipulation system;

manipulating the original packet into a manipulated original packet;

reconstructing the manipulated network based tunnel packet with the manipulated original received packet; and transferring the manipulated network based tunnel packet to the destination over network based tunnels;

wherein the step of updating the cross-reference table further comprises using parameters, wherein the parameters that are used for updating the cross-reference table further comprise the IP address of one of the plurality of IP based private data networks.

14. The method of claim 13, wherein determining whether an original packet is targeted toward the manipulation system is based on the destination address of the original packet.

15. A method for manipulating the transportation of original packets transported via an access network to the Internet between a plurality of remote clients and a plurality of IP based private data networks wherein the original packets are encapsulated in network based tunnel packets, and wherein the manipulation is done at the access network service provider's premises, the method comprising the steps of:

intercepting, at the access network service provider's premises, the transportation between the plurality of remote clients and the plurality of IP based private data networks, wherein at least two of the remote clients are in communication with different IP based private data networks;

parsing a received network based tunnel packet to determine if its encapsulated original packet is targeted toward a manipulation system;

forwarding the received network based tunnel packet, as is, towards a destination if the encapsulated original packet is not targeted toward the manipulation system;

if the encapsulated original packet is targeted toward the manipulation system, then:

retrieving the original packet out of the network based tunnel packet;

updating a cross-reference table with parameters that associate the original packet with the received network based tunnel packet, the cross-reference table enabling the reconstruction of a manipulated network based tunnel packet that will be transferred to the destination after the manipulation of the received original packet;

transferring the original packet toward the manipulation system;

manipulating the original packet into a manipulated original packet;

reconstructing the manipulated network based tunnel packet with the manipulated original received packet; and transferring the manipulated network based tunnel packet to the destination over network based tunnels;

wherein the step of updating the cross-reference table further comprises using parameters, wherein the parameters that are used for updating the cross-reference table further comprise the IP address of one of the plurality of remote clients.

16. The method of claim 15, wherein determining whether an original packet is targeted toward the manipulation system is based on the destination address of the original packet.

17. A system for manipulating the transportation of original packets transported between a plurality of remote clients via an access network and a plurality of IP based private data networks, wherein the original packets are encapsulated in network based tunnel packets, and wherein the system is at the access network service provider's premises, the system comprising:

an access gateway interface module that interfaces between the plurality of remote clients and the access network;

a border gateway interface module that interfaces between the access network and the plurality of IP based private data networks;

a manipulation module for manipulating the original packets that are encapsulated in the network based tunnel packets;

a manipulation interface module, interfacing to the access gateway interface module and the border gateway interface module and the manipulation module and that receives network based tunnel packets from, and sends network based tunnel packets to, the access gateway interface and the border gateway interface modules;

wherein the manipulation equipment interface being further operable to parse a received network based tunnel packet, retrieve an original packet, determine whether the retrieved original packet is targeted toward the manipulation system and, if the retrieved original packet is determined to have been targeted toward the manipulation system, send the retrieved original packet to the manipulation module, receive a manipulated packet that is the result of the manipulation of the original packet, reconstruct the network based tunnel packet by installing the manipulated original packet, and forward the reconstructed network based tunnel packet to either the access gateway interface or the border gateway interface, wherein the access gateway interface module maintains a table of the plurality of IP based private data networks that are users of the manipulation equipment.

* * * * *